Feb. 12, 1935. A. S. JOHNSON 1,990,652
AUTOMATIC TRAIN PIPE CONNECTER
Original Filed May 9, 1932   9 Sheets-Sheet 1

Inventor.
Albert S. Johnson
Attorney.

Feb. 12, 1935. A. S. JOHNSON 1,990,652
AUTOMATIC TRAIN PIPE CONNECTER
Original Filed May 9, 1932 9 Sheets-Sheet 5

Inventor.
Albert S. Johnson
Attorney.

Feb. 12, 1935.  A. S. JOHNSON  1,990,652
AUTOMATIC TRAIN PIPE CONNECTER
Original Filed May 9, 1932   9 Sheets-Sheet 9

Inventor.
Albert S. Johnson

Attorney.

Patented Feb. 12, 1935

1,990,652

UNITED STATES PATENT OFFICE 1,990,652

AUTOMATIC TRAIN PIPE CONNECTER

Albert S. Johnson, Los Angeles, Calif., assignor to Johnson Connector Company, Ltd., Los Angeles, Calif., a corporation of California Application May 9, 1932, Serial No. 610,280
Renewed October 30, 1934

16 Claims. (Cl. 285—58)

This invention relates generally to automatic car couplers, and more particularly to automatic couplers for train pipes.

The device of the present invention is of the same general type as that disclosed in my prior application, entitled "Automatic train pipe connecter", Ser. No. 469,014, filed July 19, 1930, and may be considered as disclosing improvements upon the original device shown in said application. Reference is also directed in my application entitled "Draw bar guide for automatic train pipe connecter", filed May 9, 1932, Ser. No. 610,279, which contains generic claims to certain subject-matter also shown in the present case.

It may be stated as an object of the present invention to provide an automatic train pipe connecter with an improved mounting on the car body, and with enhanced flexibility of movement in the various directions necessary to enable the connecter to be gathered with facility in coupling with an opposing car under the various conditions of extreme misalinement encountered in practice.

It is a further object of the invention to provide a coupler capable of being withdrawn to an out of the way position upon the occasion of coupling to a car not provided with similar equipment.

It is a further object of the invention to provide improved automatic locking means for engaged connecter heads, and also improved automatic lock releasing means operable as the cars are pulled apart.

It is a further object of the invention to provide a device wherein parts are compact and efficiently arranged, and wherein certain operative parts are entirely enclosed within the connecter arm.

It is a further object of the invention to provide a device characterized by ruggedness, reliability, and freedom from necessity of frequent repair.

The accomplishment of these objects by the present invention, as well as others to appear hereinafter, will become apparent from the following detailed description of a present preferred embodiment, reference for this purpose being had to the accompanying drawings, in which:

Figure 1:
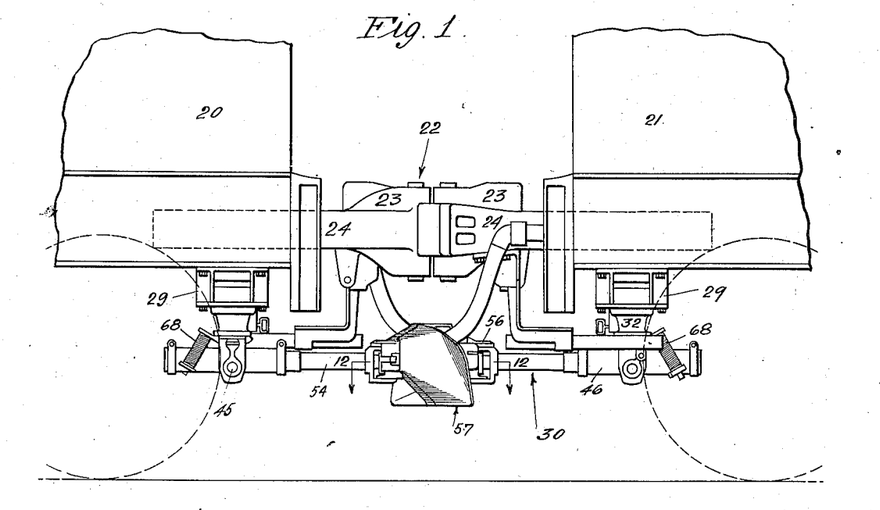
Fig. 1 is a side elevation of the meeting ends of a pair of coupled cars equipped with the devices of the present invention.
Figures 3, 19:
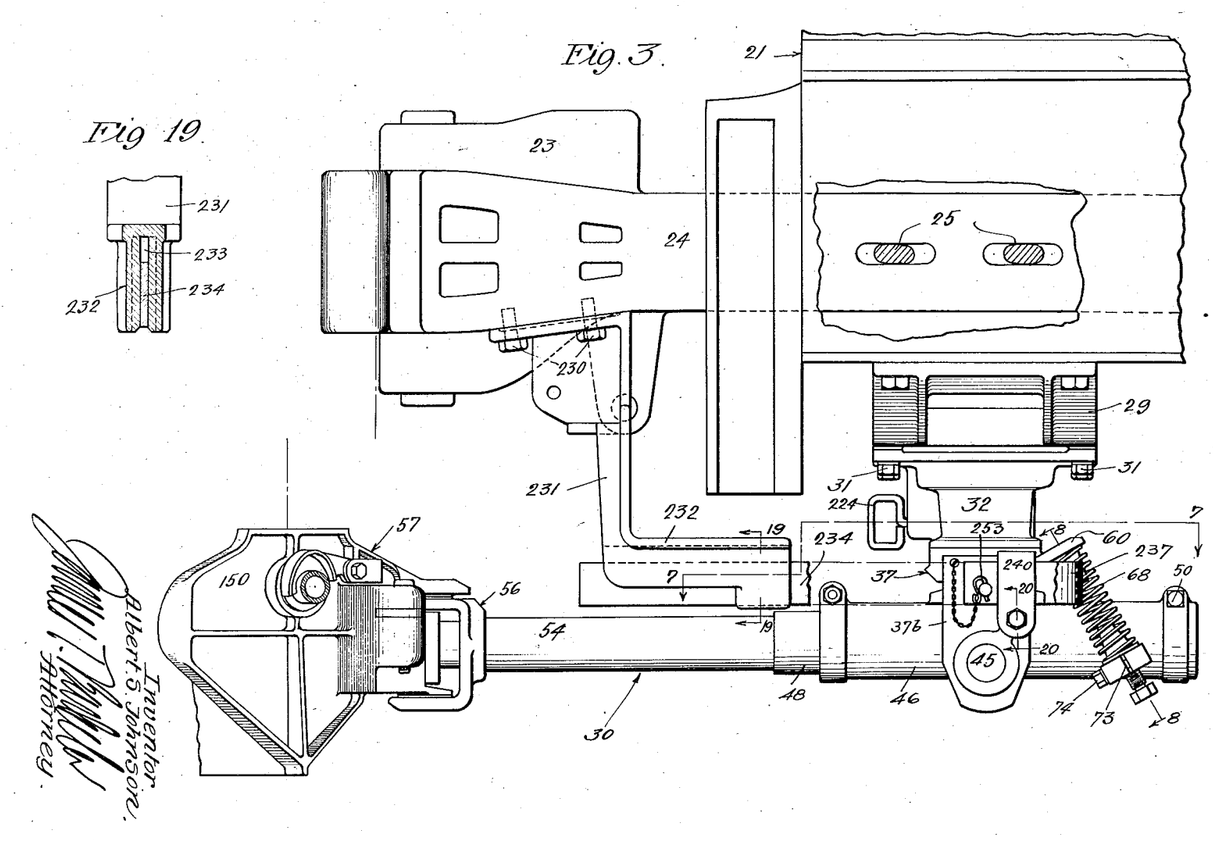
Fig. 3 is a side elevation of a car and showing the draw bar and the pipe connecter arms, and the means for guiding the pipe connecter from the draw bar.
Fig. 19 is a detail section of the draw bar guide arm and spring as taken on line 19—19 of Fig. 3.

In Fig. 1 of the drawings, numerals 20 and 21 designate a pair of cars coupled by a usual draft coupling 22, the interlocking heads 23 of which are mounted on draw bars 24. The draw bars may be mounted to swing horizontally in any usual manner, either pivoting on vertical pins, or floating laterally on suitable guides. In Fig. 3 the draw bar is indicated as floating horizontally on guide members 25. The draw bar coupler heads are of course provided with considerable gathering range so as to enable them to couple from positions of relative lateral, vertical, and rotative displacement. In case the lateral displacement of the two heads is too great to be cared for by the gathering range of the couplers, for instance on a track of considerable curvature, the draw bars are frequently thrown over horizontally by hand into positions of better alinement. This lateral movement of the draw bars to facilitate making of the draft coupling may be utilized also to facilitate coupling of the pipe connecter heads, as will appear hereinafter.

Rigidly affixed to the under structure of the car body is a suspension bracket 29 for the train pipe connecter, generally designated at 30. To the underside of bracket 29 there is secured by screws 31 a hanger 32 that provides a vertical pivot bearing for the connecter arm mounting. This bearing is formed by a bore 33 extending downwardly in member 32 from the upper end thereof, and a reduced counterbore 34 extending upwardly from the flat lower end of member 32. Mounted for rotation in bore 34 is the stem 36 of a yoke member 37. The upper end of stem 36 has screw-threaded thereon a bearing ring 38, which overhangs the shoulder 39 between bores 33 and 34 and bears down on a washer 40 resting on said shoulder to support the yoke and parts mounted thereon. Washer 40 is keyed to the stem 36 at 41, and therefore turns on bearing shoulder 39 as the yoke is rotated.

The yoke is thus mounted in bearing hanger 32 for pivotal movement about a vertical axis, such movement being limited, however, by certain stops as will be described hereinafter. The two arms 37a and 37b of the yoke carry between them a horizontal pivot pin 45 (see Fig. 6), the pin being mounted for rotation in the yoke arms. Mounted fast on pin 45 and extending between the two yoke arms is a cradle member 46 for the connecter arm. This cradle member 46 is tubular in form and extends horizontally in either direction from pin 45, as clearly shown in Fig. 5. The tubular cradle fits about a longitudinally extending connecter arm tube or cylinder 48, the cradle being longitudinally split at the top, as at 49, and being provided with clamping screws 50 adapted to be set up to clamp tube 48 tightly in place. As shown in Fig. 6, pivot pin 45 is cut out at 52 to fit snugly about tube 48.

Telescopically slidable within the tube or cylinder member 48 is a plunger member in the form of a tube 54. This plunger tube has secured on its forward end a yoke or knuckle 56 providing a vertical pivot mounting for the connecter head 57.

It will be noted that the cradle 46, the telescoping tubes 48 and 54, and the knuckle 56 and connecter head 57 carried thereby are mounted on horizontal pin 45 to swing in a vertical plane by pivoting between the arms of the pivoted yoke member 37. Means now to be described are provided for yieldingly supporting the arm in a normal position of horizontal extension and for resiliently resisting such vertical swinging movement. As well shown in Figs. 3, 5, 7 and 8, the pivot yoke member is provided at the base of its pivot stem 36 with a rearwardly extending and upwardly inclined bracket 60 providing coil spring seats or projections 61, and sleeve 46 is provided with oppositely extending bracket arms 63 and 64 which carry spring seats 65 and 66 opposite seats 61 and 62, respectively. Mounted on the seats in the manner shown in Fig. 8 are compression springs 68. The parts are so arranged that springs 68 are tangent to a circle drawn about the horizontal pivot pin 45 of the connecter arm as a center, as illustrated. In the form illustrated the projections 61 and 62 at the upper ends of the springs simply serve to position the springs, while the members 65 and 66 at the lower ends of the springs serve to center the springs and in addition are provided with flanges 69 on which the springs seat. The lower plunger seats 65 and 66, rather than being mounted rigidly on sleeve brackets 63 and 64, are preferably formed with sockets 70 which somewhat loosely take studs 71 and 72 extending from brackets 63 and 64, respectively. Stud 71 is shown adjustable, being in the form of a screw, and bracket 63 is shown split around the screw as at 73 and is provided with a clamping screw 74. With this provision it is possible to adjust the normal compression of spring 68, as will be clearly understood. It is of course possible to utilize adjustable spring seats on both sides if desired, or the feature of adjustment can of course be omitted from both sides. The mounting of the lower spring seats on studs in the manner shown permits the seats to rock on the studs during vertical swinging of the connecter arm, and in this way avoids transverse bending of the springs which would otherwise occur due to the curved path of the lower spring seats as the connecter arm pivots on its horizontal axis. These springs are of course adjusted to support the connecter arm yieldingly in a position of horizontal extension, and it will be noted that the springs support the arm in all positions of horizontal rotation on its vertical pivot mounting.

Figure 5:
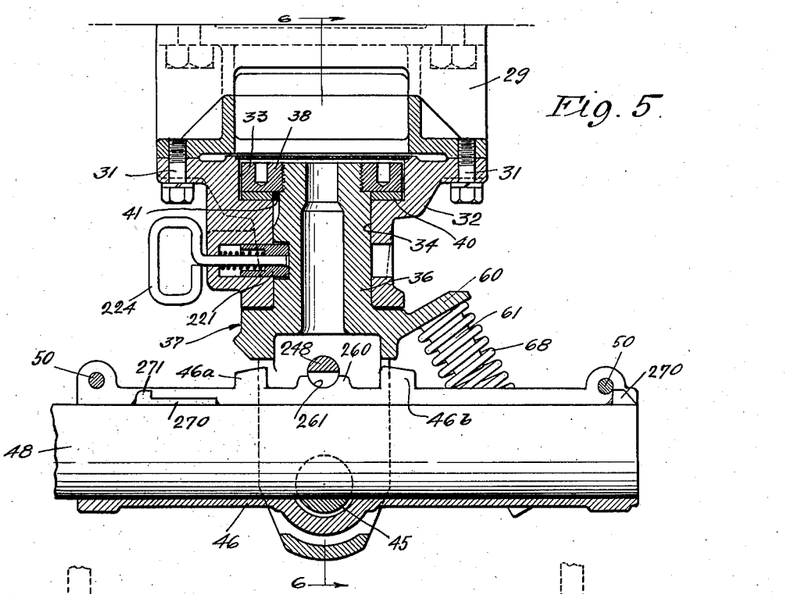
Fig. 5 is a longitudinal vertical section of the vertical pivot mounting of the draw bar connecter on the car body, this view being taken on line 5—5 of Fig. 4.
Figures 6, 20:
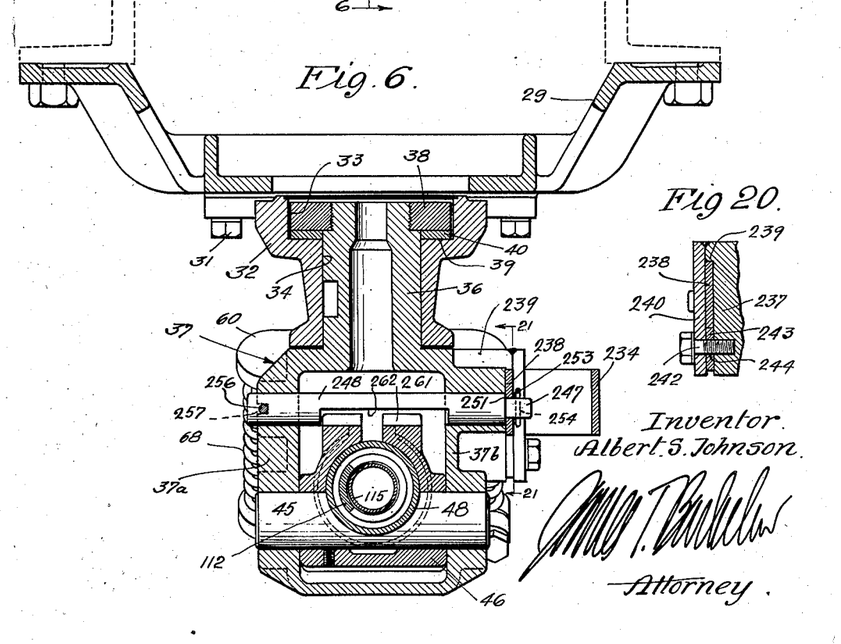
Fig. 6 is a transverse vertical section taken on line 6—6 of Fig. 5.
Fig. 20 is a detail section taken on line 20—20 of Fig. 3.

To limit vertical swinging of the coupler arm on its pivot between the yoke arms, the cradle 46 of the arm is preferably formed at the top with lugs 46a and 46b adapted to engage the yoke when the arm has swung through approximately ten degrees on either side of horizontal, as will be apparent from Fig. 5. This provision restricts the swinging of the arm to an angle throughout which the telescoping action of the arm tubes is not hindered.

The knuckle or yoke 56 mounted on the forward end of tube 54 is formed with a pair of upper and lower arms 78 and 79, respectively, the upper arm having a round upwardly extending boss 80, and the lower arm having a vertical bore 81 axially alined with the boss 80. The coupler head casting 57 is formed at its rear with a housing structure 82 for a locking device hereinafter to be described. The upper wall of said structure is extended rearwardly to form a bracket 83, and said bracket is provided with a bore 86 adapted to rotatively take the knuckle boss 80, and the lower wall of the structure is extended rearwardly to form a bracket 84, which is provided with a round downwardly extending boss 87 adapted to be rotatively taken in knuckle bore 81. Brackets 83 and 84 are provided with annular bearing surfaces 89 and 90, respectively, which bear down and turn on corresponding bearing surfaces on the knuckle as the head pivots.

Housing structure 82 includes, in the present embodiment, upper wall 94, lower wall 95, a vertical side wall 96 inclined from the rear side of the structure forwardly at about 60 degrees with reference to the longitudinal connecter arm axis, a vertical wall 97 extending rearwardly at right angles from wall 96, being therefore at about 30 degrees with reference to the longitudinal connecter arm axis, and a vertical side wall 98. The rear vertical wall of housing 82 is at right angles to the connecter arm axis, and is cut away at the top and in the center to provide for the locking device, leaving only a pair of rear wall portions or lugs 99 and 100, which present flat faces toward and at right angles to the connecter arm (see Figs. 12–15).

The forward end of arm tube 54 has slidably mounted therein a buffer tube 102 having on its forward end a buffer head 103 adapted to engage the flat faces of the rear wall lugs 99 and 100 of the connecter head.

The buffer head is preferably in the form of a square plate having a bore therethrough to take the forward end of tube 102, and is fastened to tube 102 as by welding. The two vertical sides 104 and 105 of the plate engage the two head lugs 99 and 100, respectively, on opposite sides of the longitudinal connecter arm axis (see Figs. 12–14). The rear end of tube 102 is formed with a pair of rearward projections 108 which pass through slots 109 provided in a head 110 welded within tube 54, as will be seen from Figs. 10, 11 and 12. These projections 108 come against a washer 111 to the rear of head 110, which washer in turn comes against one end of a compression spring 112, the other end of which spring bears against an abutment 113 welded within the rear end of tube 48.

It will be noted that in the various positions of Figs. 9, 10, 12 and 13, spring 112 forces washer 111 against the rearward face of abutment 110, and that the buffer tube 102 is of such length that, with its buffer head 103 in engagement with connecter head lugs 99 and 100, its rearward projections 108 just reach washer 111. Any pivotal movement of the connecter head on the vertical axis of knuckle 56, then moves one or the other of the head lugs 99 and 100 rearwardly against the buffer head, thereby moving the buffer tube rearwardly against washer 111 and spring 112. This action is clearly illustrated in Fig. 14, where the connecter head is shown slightly rocked to the left on its vertical axis, head lug 99 having moved rearwardly against buffer head 103 and having thereby moved the buffer tube rearwardly a short distance against spring 112. It will be understood how any pivotal movement of the connecter head about the vertical pivot axis on the knuckle 56 is yieldingly resisted by spring 112, and it will be understood that spring 112 constantly acts through the buffer member to return the connecter head to centered position when displaced therefrom. In the present embodiment the vertical pivot mounting of the connecter head permits the head to swing against the resistance of the buffer member, to a maximum angle of twenty seven and one-half degrees on either side of the center position illustrated.

Spring 112, bearing at one end against abutment 113 in the rear end of tube 48, and at the other end against abutment 110 in tube 54, also acts at all times to extend tube 54 from tube 48. Such extensive telescopic movement of the tubes, however, is opposed and limited as now to be described. The abutment 113 in the rear end of tube 48 carries a tube 115 that projects through spring 112, the forward end of this tube having welded therein a head 116. This head 116 is cut through with a rectangular guide slot 117 (see Fig. 10a) for a flat, tension rod 120. One function of rod 120 is to act in torsion to resist relative rotation of said telescoping tube, as will be more fully explained hereinafter, and for the purpose of the latter function the rod is formed of suitable spring material. The rear end of rod 120 is formed with an enlarged head 121 adapted to engage abutment 116 of tube 115. The forward end of rod 120 is taken within a slot 123 cut in a bolt member 124, and is fastened therein by means of a pin 123a. The shank 127 of this bolt member is rectangular in cross section, and slides through a correspondingly shaped guide slot 128 in head 110 (see Fig. 11), while the rear end of the bolt has an enlarged head 125 adapted to engage boss 126 extending rearwardly from head 110 within spring 112, as shown in Fig. 9.

The forward end 130 of bolt 124 is cylindrical and screw-threaded, and screw-threaded thereon is the head of a tubular member 135 that projects forwardly through buffer tube 102. Member 135 has a flange 136 that provides a rearwardly facing shoulder 137, and confined between said shoulder and the plunger tube abutment 110 is a compression spring 140. The rod 120 with member 124 and member 135 will be seen to constitute a tension member connecting the forward end of spring 140 with the abutment in the rear arm tube.

Figures 9, 10, 10A, 11:
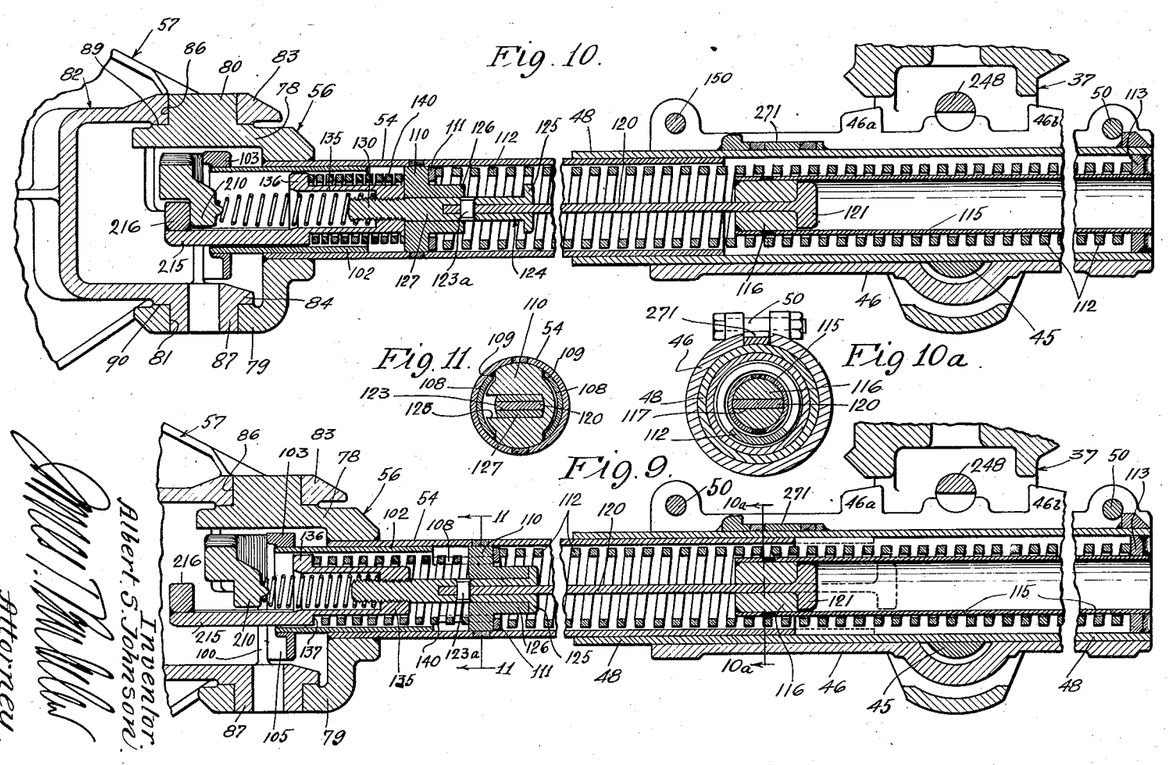
Fig. 9 is a vertical longitudinal section of the connecter arm and mounting, showing also a mounting of the connecter head on the arm, this view showing the arm in normal coupled position.
Fig. 10 is a view similar to Fig. 9 but showing the arm in uncoupling position.
Fig. 10a is a cross section of the connecter arm taken on line 10a—10a of Fig. 9.
Fig. 11 is a cross section of the connecter arm taken on line 11—11 of Fig. 9.

The full line position of Fig. 9 shows the normal uncoupled position of the connecter. It will be apparent from that figure that spring 112 is acting against head 110 to extend the plunger tube 54 from the cylinder tube 48, and that such extension is resisted by the tension rod 120, the head 121 of which engages the fixed abutment 116, and the other end of which is urged forwardly by spring 140. Spring 140 is of such strength and is under such compression relative to spring 112 that its action on the forward end of the tension member brings the head 125 thereon against plunger tube abutment boss 126 and holds it there until the plunger tube is extended during uncoupling, as later to be described. In uncoupled position (Fig. 9 in full lines) spring 112 accordingly extends the plunger tube forwardly only to the point where rear tension member head 121 engages cylinder tube abutment 116, the greater force of spring 140 preventing spring 112 from moving the plunger tube abutment 110 forwardly of tension member head 125 and thereby preventing further extension of the plunger tube. The action of these parts during coupling and uncoupling will be explained at a later point in the specification.

The torsion action of the flat rod or spring member 120 in yieldingly resisting relative rotation of telescoping tubes 54 and 48 will now be apparent. It will be remembered that the flat spring passes through a rectangular guide slot in the fixed abutment 116, and that the flat shank of the bolt 124 to which spring 120 is connected slides in a rectangular slot in the abutment 110 fixed in tube 54. Accordingly, rotation of tube 54 within tube 48 in either direction from center, is resiliently opposed by torsion of spring 120. The capability for such spring resisted rotation of tube 54 enables the coupler head mounted thereon to rotate on the longitudinal axis of the coupler arm to accommodate itself to an opposed connecter head rotatably displaced therefrom on the longitudinal connecter axis.

Figure 12:
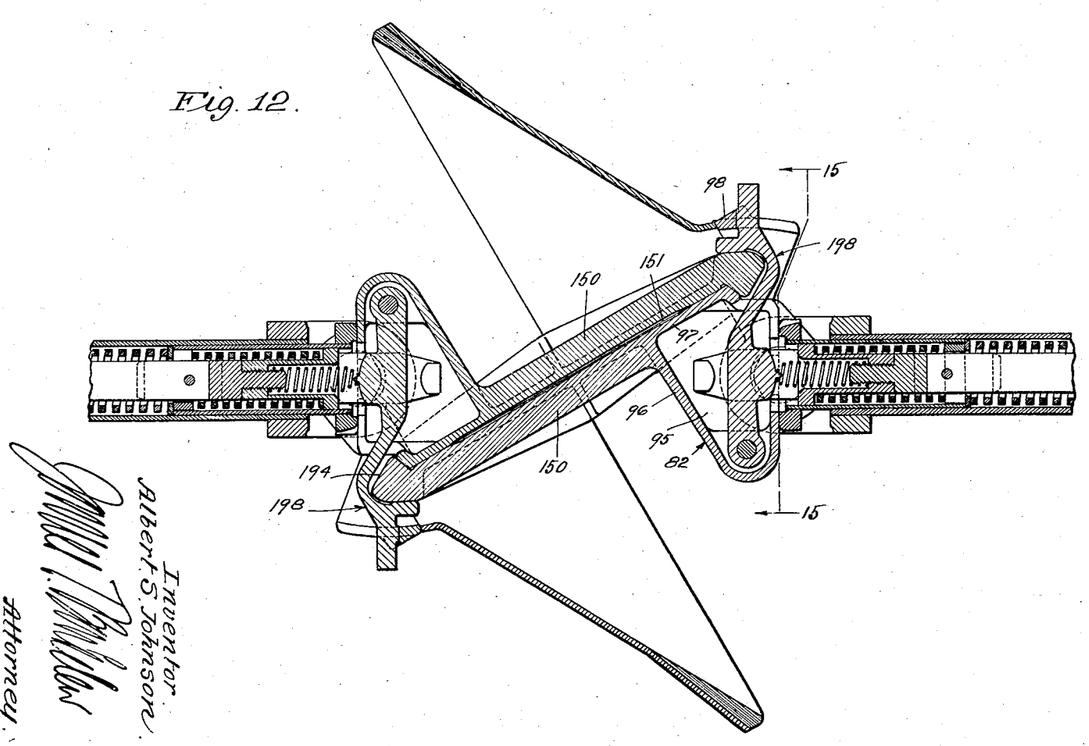
Fig. 12 is a horizontal medial section through a pair of coupled connecter heads, being a view taken as indicated by line 12—12 of Fig. 1.
Figure 16:
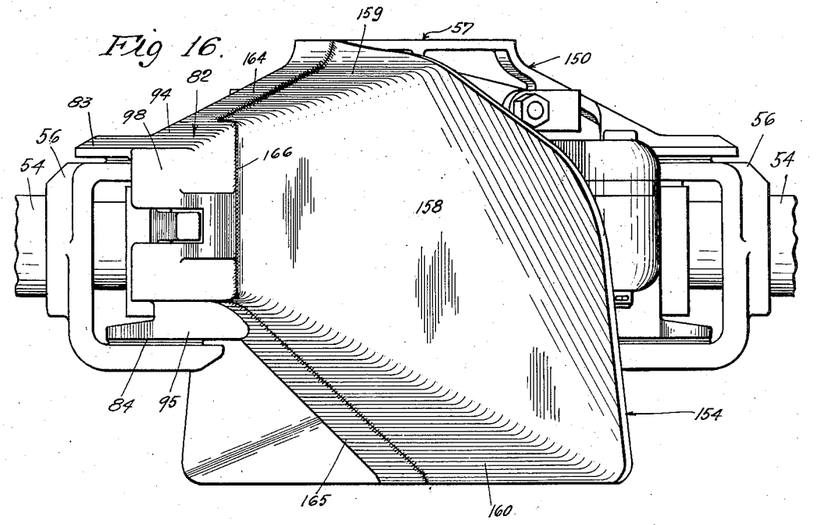
Fig. 16 is an elevation of a pair of interengaged coupler heads.
Figure 17:
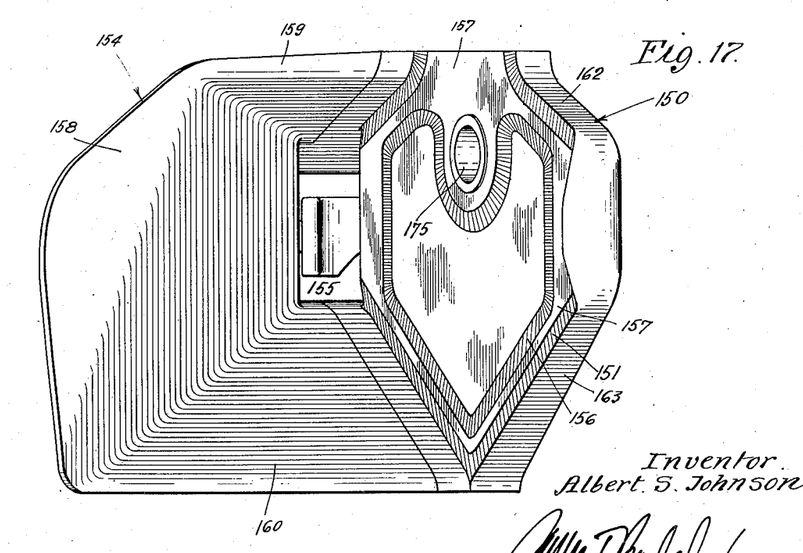
Fig. 17 is an end elevation of a coupler head looking into the flaring guide mouth thereof.

Considering now the connecter head proper, each head has extending forwardly from the previously described housing structure 82 a vertical plate or tongue part 150 which crosses the longitudinal connecter arm at an angle of about thirty degrees. As shown in Fig. 12, the forwardly facing surface 151 of this plate or tongue part extends forwardly in continuation of the exterior face of the inclined housing wall 97. The head also has a part 154 forming a flaring guide mouth terminating rearwardly in a contracted throat 155, the guide mouth of each head being adapted to receive the tongue of the other head, so that the surfaces 151 of the two tongues come into contact. Preferably, the surfaces 151 are recessed slightly as shown at 156, leaving a raised portion 157 to make the contact. The guide mouth formed by part 154 is defined by rearwardly converging side, upper and lower walls 158, 159 and 160, respectively all tapering toward the open contracted throat 155. The forward portion of each tongue member 150 is formed with converging upper and lower edges 162 and 163, respectively, adapted to ride and be guided down or up the inclined walls 159 and 160 of the guide mouth of the opposing head into proper elevation for connection, while the side wall 159 of the mouth gathers the tongue laterally into position. The rearward portion of each tongue is provided with upper and lower edges 164 and 165, respectively that converge rearwardly. The edges of the casting part 154 that forms the guide mouth, are welded to said rearwardly converging tongue edges, and also to the housing structure 82 to 166 (see Figs. 16 and 17).

Thus the tongue of each head moves into the guide mouth of the other head as the cars are moved together, the flaring of the guide mouths being sufficient to gather the heads properly within comparatively wide limits of misalinement.

Figure 23:
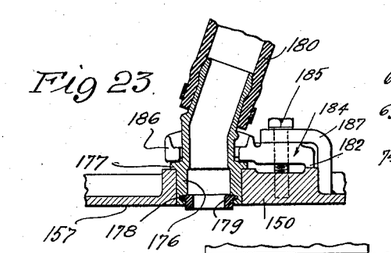
Fig. 23 is a section taken on line 23—23 of Fig. 22.

Opening to the contact surface 157 of each tongue 150 is an air port 175. Only one such air port is here shown, but it will be obvious that the tongue may be provided with as many vertically alined ports as are required. A gasket sleeve 176 is removably inserted in this air port, the sleeve being provided with an annular flange 177 adapted to shoulder up against the rear side of the tongue when the sleeve is inserted therein, as illustrated in Fig. 23. The forward end of this sleeve has an internal groove 178 which receives the standard gasket 179, the gasket projecting normally slightly out beyond the contact surface 157 of the tongue, and being adapted to be forced back in the port due to engagement with an opposing gasket as the connecter heads interengage. The outer end of sleeve 176 is adapted for connection of an air hose 180, as shown, and preferably is bent at an angle such that the hose will clear the flaring guide mouth of an opposing connecter head. The gasket sleeve is removably clamped in place by a clamp member 184, which is pivoted on a screw 185 threaded into tongue 150, and has a semi-circular part 186 that engages the sleeve behind flange 177, the rear end of the clamp having a lug 182 that engages the surface of the tongue, as clearly shown in Fig. 23. To release the gasket sleeve for removal, this clamp member is loosened by loosening screw 185, and is then swung aside. As well shown in Fig. 23, there is also provided a guard member 187 welded to the tongue and engaging the outer surface of the clamp member below the head of screw 185, the guard being drilled to pass said screw. This guard retains the clamp in place in case of failure of screw 185.

Figures 14, 15, 18:
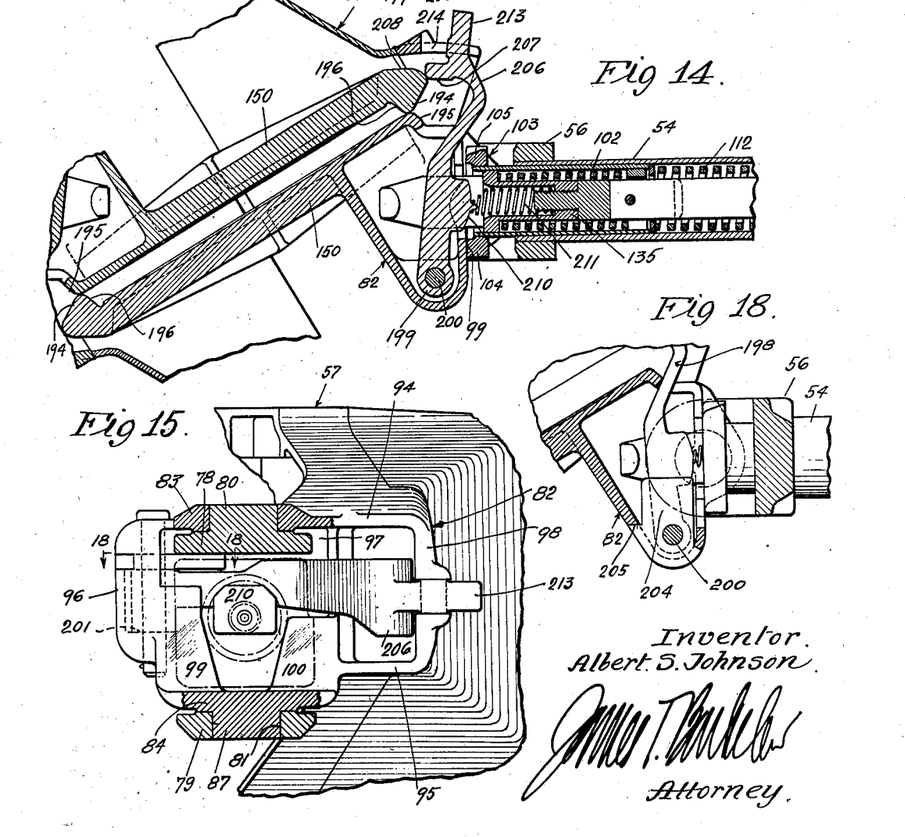
Fig. 14 is a view similar to Fig. 13, but showing the pipe in a position during coupling.
Fig. 15 is a vertical section taken on line 15—15 of Fig. 12.
Fig. 18 is a detailed section taken on line 18—18 of Fig. 15.

The tip of each tongue 150 is formed with a projecting lug 194 which engages the face of the opposing tongue as the heads come together. This lug is below the air port, and consequently clears the projecting gasket. As the heads move together, the engagement of these lugs 194 with the opposing tongues causes the two heads to pivot through a certain angle on their vertical pivot mountings on the supporting knuckles 56. This action is illustrated in Fig. 14, where the lugs 194 are shown in engagement with the tongues near the bases thereof, the head illustrated having rocked and moved its lugs 99 rearwardly against the buffer plate 105, which has moved rearwardly against springs 112, the other head lug 100 at this time being separated from the buffer plate, as shown. Thus the engagement of the tongue lug of the two heads with the opposing tongues brings about a spring resisted rock of the two heads on their vertical pivot mountings. As the heads continue to move together, the heads pivoting as described, the tongue lugs hold the tongues separated until the air port gaskets are nearly alined, and then finally ride down seating surfaces 195 to permit the opposed tongues to come together. The seating surfaces 195 and the corresponding surfaces 196 of the tongue lugs are formed in planes nearly at right angles to the contact faces of the tongues, so that when the heads are moved to a point where the gaskets are substantially alined, the movement of the tongue lugs down the seating surfaces 195 brings the tongues substantially straight toward each other, the tongues moving towards each other aided by the force exerted by the spring pressed buffers which are acting on the heads because of the pivotal displacement given to the heads in passing through the position illustrated in Fig. 14. The opposing projecting gaskets thereupon engage one another and are forced back into their ports as the contact faces meet. When the heads have in this manner reached the position of Fig. 12, the lugs 194 of each tongue are in snug engagement with the seating surface 195 of the opposed tongue, and it will be evident that these provisions hold the tongues against relative longitudinal movement until they have again separated.

To hold the tongues against such separative movement until the heads are intentionally to be disconnected, there is provided a latching device 198 which automatically engages the end of the tongue as the heads reach the interengaged position of Fig. 12. In the present preferred form, this latching device takes the form of a latch member 198 contained within the previously described housing structure of the head. The latch member has a hub 199 mounted to pivot on a vertical pin 200 mounted in the walls of structure 82, said hub 200 resting down on a horizontal bearing surface 201 provided in the housing.

At this point may be conveniently described a retaining plate 204 designed to retain the coupler head on the knuckle. This retaining plate is mounted on pin 200 directly above latch hub 199 (see Figs. 15 and 18), and fits into a slot 205 cut in the side wall of the lock housing 182. This plate projects inwardly to engage the under surface of head bracket 78 so as to prevent vertical movement of the head on the knuckle. In assembling the device, the head is moved downwardly into position on the knuckle, and this retaining plate is then slipped into position from the outside and fastened by the insertion of pin 200.

Returning to consideration of the latching device, from hub 199 the latch extends horizontally across and substantially at right angles to the longitudinal coupler axis to a hook-end 206, which is adapted to hook over the forward end of the tongue of the opposing head. Hook 206 is provided with a tongue engaging surface 207 which is substantially parallel to the longitudinal axis of the coupler arm when the latch is hooked over the opposing tongue, and the cooperating seating surface 208 on the rear surface of the tongue end is formed in the same plane. Lock 198 has intermediate its ends a lug 210 which is alined with the longitudinal axis of the coupler arm, and said lug is adapted to provide a seat for one end of a compression spring 211, the other end of which extends within the bore of tubular member 135 and engages an annular shoulder 212 at the head thereof. This spring serves the purpose of constantly urging the latch toward latching position. The latch is shown with an extension 213 projecting from its hook end out through a slot 214 in the housing wall, by means of which the latch may be manually operated if desired.

Fig. 14 shows the action of the latch during coupling, the forward end of the entering tongue member in that figure having engaged the hook end of the latch to move the latch rearwardly against spring 211. From this position the entering tongue member moves forwardly a slight distance further and then as the tongue lug 194 moves down seating surface 195 and the two tongues come together, the latch finally slips over the tongue end, the latch and tongue seating surfaces 207 and 208 fitting snugly together as shown in Fig. 12. The latch is then held in this position by the force of spring 211, and it will be evident that until the latch is retracted the tongues cannot be separated.

As previously stated, Fig. 9 in full lines shows the position of the connecter arm parts in uncoupled position. Fig. 3 also shows the same position, and also shows that in uncoupled position the connecter head extends outwardly somewhat beyond the end of the draw bar coupler head. As the cars move together, the interengagement of the pipe connecter heads causes the plunger tubes 54 of the connecter arms to retract within the cylinder tubes 48 against the force of springs 112 until the draft couplers engage, this action bringing the tubes to the dotted line position of Fig. 9. During this operation, the connecter heads will have rocked on their vertical pivotal mountings on the knuckles 56 against the spring pressed buffer plates as the two tongues interengage and finally come into face to face contact, and the latches will have become hooked over the tongue ends to lock the heads securely together, the parts then being in the position illustrated in dotted lines in Fig. 9 and in full line in Fig. 12. When the cars are coupled the telescoping coupler arm tubes thus ride in the retracted dotted line position of Fig. 9, the compression spring 112, which acts to extend the plunger tube, being at such time under some compression, and the tension rod 120 having carried its rearward head 121 rearwardly of abutment 116. Small relative movements of the coupled cars as slack comes into or is taken out of the draft coupling is then taken up in each connecter by relative movement of tube 54 in tube 48, cushioned by spring 112.

Figure 13:
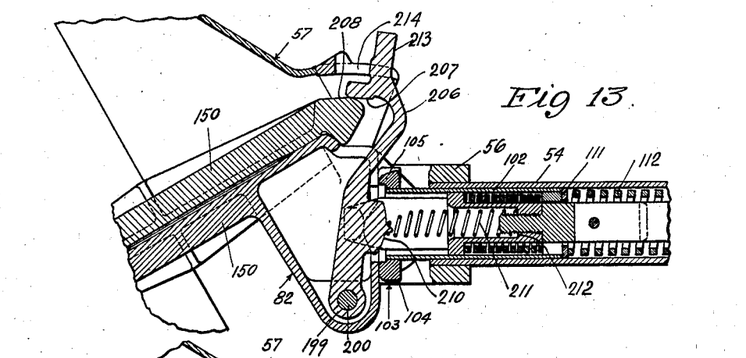
Fig. 13 is a fragmentary view of a portion of the structure shown in Fig. 12, but showing the locking device being released to permit the head to uncouple.

It remains now to explain the uncoupling of the connecters, and for this purpose reference is had to Figs. 10 and 13. To uncouple the cars, the draft coupler heads 23 are released and the cars moved apart. Since the pipe connecter heads are still locked together, this causes the plunger tube 54 of each connecter arm to be extended from its cylinder tube 48 beyond the normal uncoupled arm position, spring 140 compressing under the force of separating the cars as the tube moves to this extended position, as shown in Fig. 10. For release of the latch, the tubular member 135 attached through bolt member 127 to tension rod 120, is provided with a forwardly reaching hook member 215 having an upstanding lug 216 which is adapted to engage the rear side of latch lug 210 and move the latch rearwardly to release the tongue during such extension of the connecter arm. It will be evident that as the arm extends, the head 121 of tension rod 120 engages abutment 116, which arrests the forward movement of the tension rod and tubular member with its hook part 215, so that the relative forward movement of the head and tube 54 brings the latch lug against hook lug 216 and so causes relative rearward movement of the latch (see Figs. 10 and 13) and consequent release of the connecter head. The parts preferably are so designed that this lock release occurs after the plunger tube has been extended somewhat beyond the normal uncoupled arm position. It will be noted that at the time the latches are released, the springs 112 that act on the buffer members accordingly are well extended and exert little if any force to resist the necessary rocking of the connecter heads on their knuckle mountings during the disengagement. The extension of the plunger tube from the cylinder tube of each connecter, as previously explained, is yieldingly resisted by the spring 140, and when the connecter heads have disengaged, this spring 140 immediately acts to cause retraction of the extended plunger tube to the uncoupled position shown in full lines in Fig. 9. It will be seen from Fig. 10 that engagement of the rearward end of member 135 with abutment 110 sets a positive limit to the extension of the arm. The parts of course are so arranged that the heads are unlocked within the limit set by this engagement.

It is to be noted that the limiting stop head 125 on the tension member in engagement with the plunger tube abutment 110 fixes the position of the tension member, and consequently the position of the latch release lug on the forward end thereof, relative to the head and latch, thus maintaining the latch release member in proper operative relation to the latch.

Figure 7:
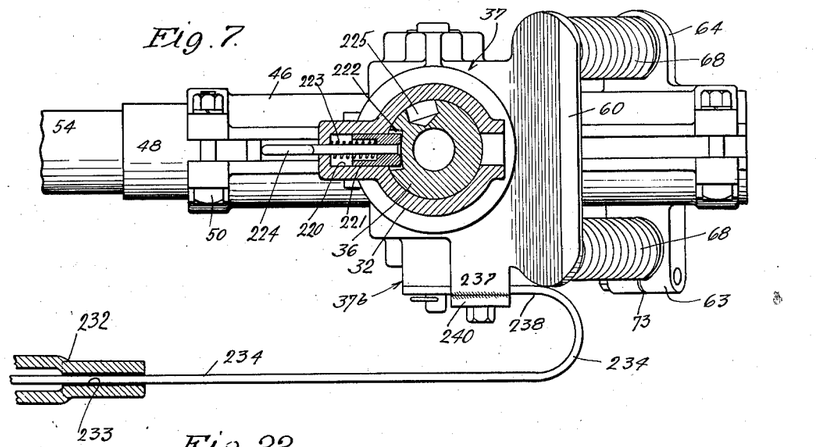
Fig. 7 is a view taken as indicated by broken line 7—7 of Fig. 3.
Figure 8:
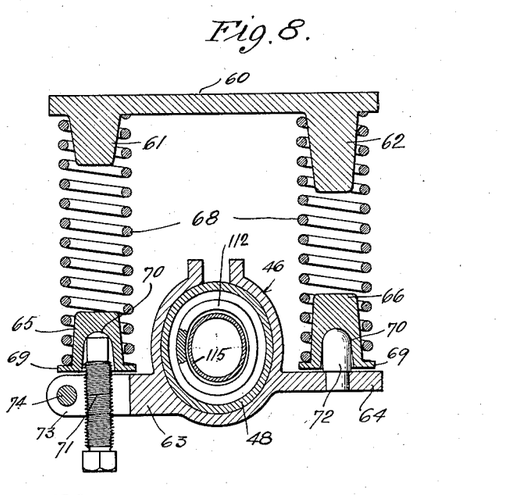
Fig. 8 is a sectional view of the spring supporting means for the connecter arm, being a view taken as indicated by line 8—8 of Fig. 3.

Fig. 7 shows the provisions for limiting the horizontal swing of the connecter arm. As there shown the side wall of the pivot bearing member 32 is formed with a bore 220 within which works a locking plunger 221 which is adapted to be received within a notch 222 cut in the stem of the pivot yoke member 37. Notch 222 is of sufficient horizontal length to permit the pivot yoke stem to swing through the angle necessary for proper operation of the connecter arm, which may be for instance about ten degrees.

This limitation on the horizontal swing of the connecter arm is not too great to prevent the arm from swinging sufficiently for the purpose of coupling, but prevents the arm from swinging out undesirably far during the coupling. It will be evident, for example, when the cars are on a curved track and the two connecter arms are at an angle to one another, that as the pipe connecter heads engage the tendency is for the arms to swing outwardly. Such outward swinging of the arms if unrestricted would cause the telescoping tubes to bind so that the arms could not retract, and would also cause damage to the draw bar guide provision described hereinafter, whereas by limiting the horizontal swing of the arms these undesired results are prevented.

Back of plunger 221 is a spring 223 which constantly urges the plunger into locking engagement with the pivot stem, and connected to the plunger and extending out through the side wall of bearing member 32 is a handle member 224, by means of which the plunger may be retracted to permit the connecter arm to be swung beyond the limit permitted by notch 222. For instance, when it is desired to carry the connecter arm in inoperative position, this handle 224 is pulled and the connecter arm rotated to a position at right angles, another notch 225 being provided in the pivot stem to permit the arm to be locked in that position. This inoperative position will be referred to in more particular hereinafter.

It has been described how the pipe connecter arm is mounted to swing horizontally through a limited angle on a vertical pivot mounting on the car body, and it has been mentioned that the draw bar is mounted on the car for horizontal swinging movement. When a car is to be coupled on curved tracks the draw bars are frequently thrown over to one side or the other into positions of better alinement in order to facilitate coupling. Means are preferably provided for guiding or positioning the pipe connecter arm to swing horizontally along with horizontal swinging of the draw bar, so as to assure that if the draw bars are in such relative horizontal positions as to be capable of coupling, then the pipe connecter arms will also be in relative positions from which coupling will be made.

Figure 4:
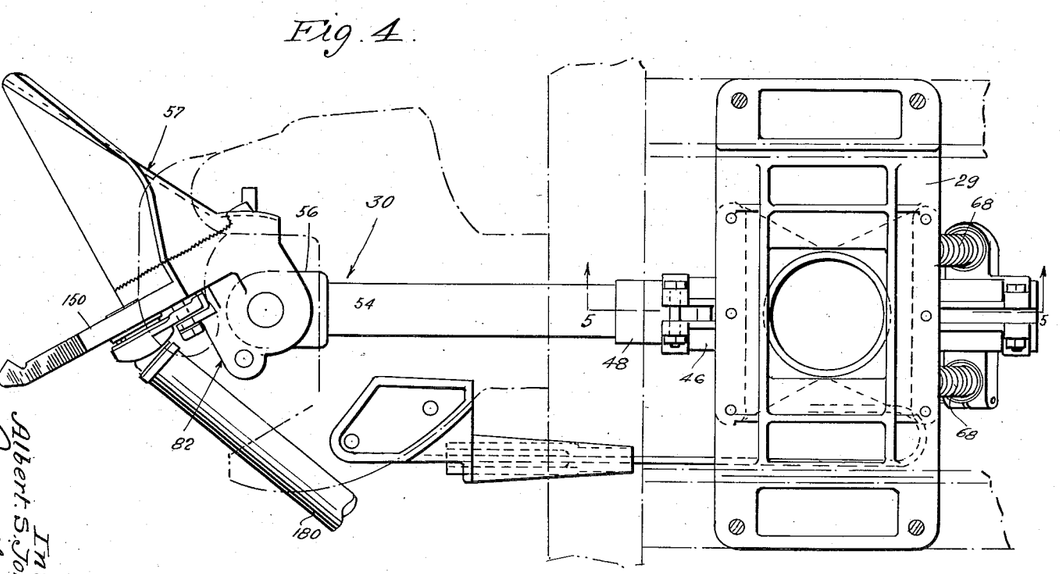
Fig. 4 is a plan view of the pipe connecter and draw bar guide arm, the overlying draw bar coupling being indicated in dot-dash lines.

I here show a draw bar guide arm for so positioning the pipe connecter arm. For this purpose there is secured as by screws 230 to the underside of the draft coupler head, or to the draw bar at a point thereon that swings horizontally to an extent sufficient for the purpose, a depending guide arm 231, which in the present form drops somewhat to one side of the connecter arm (see Fig. 4), and then turns rearwardly as indicated at 232. This rearward horizontal arm portion 232 is formed with a longitudinally extending slot 233, open at the bottom (see Figs. 7 and 19), that somewhat loosely takes an arm 234 that extends parallel to the connecter arm, and that is arranged to afford a resilient connection with the connecter arm so as to move it horizontally with horizontal movement of the draw bar. This arm 234, which is here shown in the form of a flat spring disposed with its flat sides vertical, extends rearwardly to a point to the rear of the vertically pivoted yoke 37 on which the connecter arm is mounted, and then recurves forwardly at 245 for connection to the leg 37b of said yoke. The yoke has a boss 237 providing a flat vertical surface against which the recurvate end 238 of the spring arm bears, and a part 239 that projects over the arm and carries a depending clamping plate 240 in engagement with the outer surface of spring end 238. The lower end of arm 240 is drilled to take a screw 242 that screwthreads into the aforementioned boss 237. Welded to the lower edge of the recurvate end of spring arm 234 is a lug 243 provided with a drill hole 244 through which screw 242 passes, as shown in Figs. 6 and 20. The forward end of the recurvate spring arm portion 239 is drilled with a hole 246 to receive the reduced end 247 of a pin 248 that extends horizontally through yoke arms 37a and 37b, as clearly shown in Fig. 6. This pin 248 is longitudinally slidable in the yoke arms, and when the pin is home the pin shoulder 251 is against spring end 238. The pin is fastened in this position by means of a hook 253 that is inserted in a hole 254 drilled through the reduced pin end. The other end of pin 248 is provided with a cross pin 256 which is received within a slot 257 in yoke arm 37a when the pin is home, the pin thus being keyed against removal, and against rotation. The spring end 238 is thus rigidly secured to the vertically pivoted arm-carrying yoke by means of clamping plate 240 and screw 242, acting together with pin 248.

It will be understood that by virtue of these provisions horizontal swinging of the draw bar acts through the draw bar guide arm and spring arm 234 engaged thereby, to rotate the pivot yoke and thereby cause the connecter arm to follow the horizontal swing of the guide arm. This swing, however, is limited in extent to about five degrees on either side of center by the stop plunger 221 and notch 222 in the yoke bearing members; and when the draw bar swings to one side to an angle greater than that allowed the connecter arm, the over-movement of the draw bar is taken up by flexure of spring arm 234. These provisions assure that if the draw bars are in sufficiently good alinement to make the draft coupling, the pipe connecter arms will automatically have been brought into such alinement as will assure making of the pipe connection. The draw bar guide is generically and specifically claimed in the previously mentioned case Ser. No. 610,279.

Figure 21:
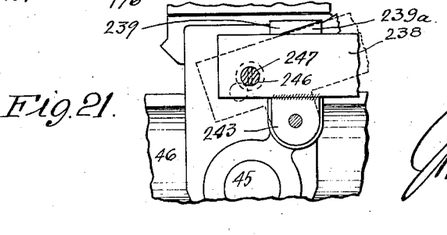
Fig. 21 is a detail taken on line 21—21 of Fig. 6.
Figure 22:
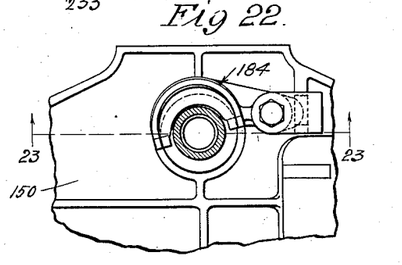
Fig. 22 is a fragmentary view of the rear side of the tongue of the connecter head showing the hose clamp.

As has previously been mentioned, the pipe connecter arm is designed to be swung on its vertical pivot mounting to an inoperative position crosswise of the car length. This position is of advantage when a car having an automatic pipe connecter is to be coupled to a car not so equipped, as will frequently occur during the period of transition to universal use of automatic connecters, and also in case of damage to the connecter. When it is desired to swing the connecter arm to its inoperative crosswise position, the hook 253 is removed from the end 247 of pin 248 and the pin pulled from the other end out of engagement with end 238 of spring arm 234. The screw 242 that passes through the spring arm leg 243 is then loosened, which permits the spring arm to pivot thereon. The yoke part 239 that projects out over the spring arm is cut with an angular notch 239a (see Fig. 21) that permits the spring arm then to be tilted downwardly to the angle indicated in Fig. 21, which lowers the forward end of the spring arm out of the groove 233 of the draw bar guide part 232. The spring arm then clears the draw bar guide, and by pulling the stop plunger handle 224, the connecter arm and spring arm are freed to swing horizontally to the inoperative crosswise position mentioned. The inoperative position stop plunger notch 225 in pivot yoke stem 36 is preferably at about seventy degrees from the center notch 222 (see Fig. 7) so that the connecter arm in inoperative position is secured at about seventy degrees from its normal straight forward direction, where there is good clearance between the connecter head and the car wheel.

Means are preferably provided for holding the connecter arm rigidly against vertical swinging when in the inoperative right angle position. For this purpose the upper side of the connecter arm tube cradle 46 is formed directly below pin 248 with lugs 260 providing an arcuate seat 261 for the round surface of pin 248. Pin 248 is notched in the center, as indicated at 262, so that when it is in the normal position illustrated in Figs. 5 and 6, there is a clearance between the cradle lugs 260 and the pin sufficient to permit the normal vertical swing of the connecter arm. When pin 248 has been pulled for the purpose of enabling the spring arm 234 to be dropped when the connecter arm is to be swung to its inoperative position, the cross pin 256 in its end is out of slot 257, and this permits the pin to be given a half turn before it is shoved back, which brings the rounded surface of the pin into engagement with arcuate seating surface 261 on the cradle. It will be evident that the pin in this position rigidly locks the cradle against rocking on its horizontal pivot. When the pin has thus been rotated to cradle engaging position, and the connecter arm has been swung to its cross-wise position, the pin is shoved home to again engage the spring arm end, after which hook 253 is inserted back in the pin end to secure the parts in place.

Figure 2:
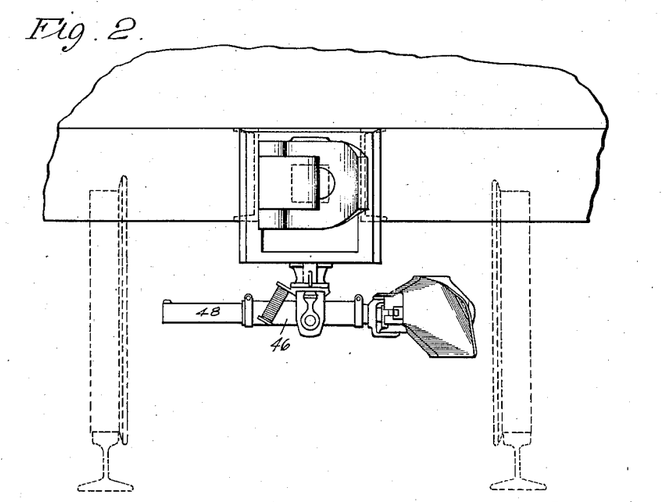
Fig. 2 is an end elevation of a car equipped with the connecter of the present invention, the connecter in this view being shown moved to its inoperative carrying position.

The connecter arm can be carried indefinitely in the position in which it has then been placed. It is preferable, however, to loosen the cradle screws 50 and slide the connecter arm tube 48 rearwardly in the cradle to the position designated in Fig. 2. To limit this longitudinal sliding movement of tube 48 within cradle 46, the rear end of the tube is provided at the top with a stop key 270 adapted to engage the rear cradle screw 50 when tube 48 is forward, and the tube is provided at the proper point forwardly thereof with another stop 271 adapted to engage the rear cradle screw 50 when the tube is at its proper rearward limit. When the arm has been moved rearwardly to the position of Fig. 2, the cradle screws 50 are again set up to secure the arm tightly in that position. The connecter arm is then locked against horizontal swinging by the stop plunger in the pivot yoke bearing, is locked against vertical swinging by means of the pin 248 then in engagement with the cradle seating surface 261, and the cradle grasps the connecter arm near its middle, so that the connecter head is well removed from the car wheel.

It will be understood the drawings and description are to be considered merely as illustrative of rather than restrictive on the broader claims appended hereto, for various changes in design, structure and arrangement may be made without departing from the spirit and scope of said claims.

I claim:

1. In combination: a vehicle, a coupler hanger secured to said vehicle, a yoke having a vertical pivot mounting in said hanger and having depending yoke arms, a coupler arm mounted on a horizontal pivot between the arms of said yoke, resilient means applied between said arm and yoke yieldingly supporting the arm in a position of horizontal extension throughout all positions of rotation of said arm and yoke about the vertical pivot axis of said yoke mounting, and a pin rotatably mounted in the yoke arms above said horizontal arm pivot and having a surface adapted when the pin is rotated to engage said coupler arm to hold it against vertical swinging about said horizontal arm pivot.

2. In combination: a vehicle, a coupler hanger secured to said vehicle, a yoke having a vertical pivot mounting in said hanger and having depending yoke arms, a coupler arm cradle mounted on a horizontal pivot between the arms of said yoke, and a coupler arm releasably clamped in said cradle, said coupler arm longitudinally movable in said cradle and adapted to be clamped therein either at its rear end or near its middle portion, whereby said coupler arm may take a position clamped in said cradle at its rear end and extending in the direction of the vehicle length, or clamped in the cradle nearer its middle and extending substantially transversely of the vehicle length.

3. A coupler arm comprising a pair of tubular members associated for longitudinal telescopic movement, the rearward one of said members being adapted to be mounted on a vehicle, a compression spring within said tubular members acting to resist telescopic contractive movement of said tubes, a compression spring within the forward one of said tubular members, a tension rod connected between said rearward tubular member and the forward end of said last mentioned spring, and an abutment in the forward tubular member for the rearward end of said last mentioned spring.

4. A coupler arm comprising a pair of tubular members associated for longitudinal telescopic movement, the rearward one of said members being adapted to be mounted on a vehicle, a compression spring within said tubular members acting on the forward member to extend it from the rearward member, a compression spring within the forward member, an abutment within the forward member for the rearward end of said last mentioned compression spring, an abutment in the rear tubular member, a tension rod connected to the forward end of said last mentioned spring and having at its rearward end a forwardly facing surface adapted to engage the rearward side of the abutment in the rear tubular member, a forwardly facing surface on the intermediate portion of the tension rod adapted to engage a rearwardly facing surface on the abutment in the forward tubular member, the last mentioned spring exerting sufficient force relative to the first mentioned spring to maintain the last mentioned forwardly facing surface on the tension rod normally against said forward tube abutment, all in such a manner that the arm takes a normal uncoupled position with the forwardly facing surface on the rear end of the tension rod against the abutment in the rearward tubular member and the forwardly facing surface on the intermediate portion of the tension rod against the abutment in the forward tubular member.

5. In combination, a coupler arm embodying a rear supporting tube and a forward tube associated therewith for telescopic movement, a connecter head mounted on the forward end of said forward telescoping tube, lock means movably mounted on said head and operable automatically to lock said head to a mating head, a compression spring within said tubes acting to cause telescopic expansive movement of said tubes, a tension rod running through said tubes, an abutment in the rear tube adapted to pass said tension rod, a head on the rear end of said tension rod adapted to engage said abutment, an abutment in the forward tube adapted to pass the tension rod, a compression spring acting between the forward side of said abutment and said tension rod to hold said rod yieldingly in a forward position with its rear end head in engagement with the rear tube abutment, and to resist telescopic expansive movement of said tubes, and the forward end of said rod being adapted to be engaged by said lock means for release thereof during telescopic expansive movement of said tubes.

6. In combination, a coupler arm embodying a rear supporting tube and a forward tube associated therewith for telescopic movement, a connecter head mounted on the forward end of said forward telescoping tube, a latch member pivoted on said head for movement to engage a mating head, said latch having a portion of its length opposite the open forward end of the tubular coupler arm, and a latch releasing rod extending through said telescoping tubes to engage, in effect, said rear supporting tube, and having at its forward end a lug normally disconnected from the latch but adapted to engage the portion of said latch opposite the open end of the coupler tubes to cause retraction of the latch during telescopic expansive movement of said tubes.

7. In a train pipe coupler, a pair of coupler arms extending along a longitudinal line from a pair of adjacent car ends, a pair of interlocking connecter heads vertically pivoted on their respective connecter arms, each head including a tongue having a contact face adapted to meet a corresponding face on the tongue of the other head, and the contact faces of said tongues being formed in a vertical plane diagonal of and crossing the longitudinal line of the coupler arms, said tongues having projecting parts adapted to ride down depressed seating surfaces on the opposing tongues whereby the contact faces of opposite tongues are prevented from sliding on one another, a latch pivotally mounted on each head having a hook part adapted to hook over a seating surface on the outside face of the tongue of the opposite head to hold the contact faces of said tongues together, said latch extending from said hook part in a direction toward and substantially transversely of the longitudinal line of the coupler arm to a vertical pivot mounting for the latch on the head, and the engaging surfaces between each latch and the opposing tongue being substantially parallel to the longitudinal line of the coupler arms, and yielding means urging said latches to latching position.

8. In a train pipe coupler, a pair of coupler arms extending along a longitudinal line from a pair of adjacent car ends, a pair of interlocking connecter heads mounted on the ends of their respective connecter arms, each head including a tongue having a contact face adapted to meet a corresponding face on the tongue of the other head, and the contact faces of said tongues being formed in a vertical plane diagonal of and crossing the longitudinal line of the coupler arms, a latch pivotally mounted on each head and having a hook part adapted to hook over the forward end of the opposing tongue, said latch extending from said hook part in a direction toward and substantially transversely of the longitudinal line of the coupler arm to a vertical pivot mounting for the latch on the head, and yielding means urging said latches to latching position.

9. In combination, a coupler arm embodying a rear supporting tube and a forward tube associated therewith for telescopic movement, a connecter head mounted on the forward end of said forward telescoping tube, a torsion spring running through said telescoping tubes, means keying the rear end of said torsion spring against relative rotation in said rear supporting tube, and means keying the forward end of said spring against relative rotation in said forward tube, whereby said torsion spring resiliently resists relative rotative displacement of said tubes.

10. In combination, a coupler arm embodying a rear supporting tube and a forward tube associated therewith for telescopic movement, a connecter head mounted on the forward end of said forward telescoping tube, a torsion spring member running through said tubes, said member having flat sides near its rear end, a guide in the rear supporting tube having a flat sided opening passing the rear end of said torsion spring member so as to permit said member to slide longitudinally therein but to key the member against rotation, and means keying the forward end of said spring member against rotation in the forward tube.

11. In combination, a coupler arm embodying a rear supporting tube and a forward tube associated therewith for telescopic movement, a connecter head mounted on the forward end of said forward telescoping tube, a torsion spring member running through said tubes, said member having flat sides near its forward end, a guide in the forward coupler arm tube having a flat sided opening passing the flat sided forward portion of said torsion spring member so as to permit said member to slide longitudinally therein but to key the end of the member against rotation, and means keying the rearward end of said spring member against rotation in the rear coupler tube.

12. In combination, a coupler embodying a rear supporting tube and a forward tube associated therewith for telescopic movement, a connecter head mounted on the forward end of said forward telescoping tube, a torsion spring member running through said tubes, said member having flat sides near its forward and rearward ends, guides in the forward and rearward coupler arm tubes having flat sided openings passing the flat sided forward and rearward portions, respectively, of said torsion spring member so as to permit the ends of said member to slide longitudinally therein but to key the ends of said member against relative rotation in the corresponding tubes.

13. A two part coupler arm comprising a rearward part adapted to be mounted on a supporting body, a forward part adapted to be extended from said rearward part and to retract, a compression spring coaxial with said arm acting to resist retractive movement of said forward part relative to said rearward part, another compression spring coaxial with said arm, abutment means on said forward arm part providing an abutting surface for the rearward end of said last mentioned spring, abutment means on said rearward arm part, a tension member connected to the forward end of said last mentioned spring and having at its rearward end a forwardly facing surface adapted to engage the abutment means on said rearward arm part, and a second forwardly facing surface on said tension member adapted to engage a rearwardly facing surface on the abutment means on said forward arm part, the last mentioned spring exerting sufficient force relative to the first mentioned spring to maintain the last mentioned forwardly facing surface on the tension rod normally against the abutment means on said forward arm part, all in such manner that the arm takes a normal uncoupled position with the said forwardly facing surfaces on the tension member in engagement with the abutment means on the rearward arm part and the forward arm part respectively.

14. A two part coupler arm comprising a rearward part adapted to be mounted on a supporting body, a forward part adapted to be extended from said rearward part and to retract, a compression spring coaxial with said arm acting to resist retractive movement of said forward part relative to said rearward part, another compression spring coaxial with said arm, abutment means on said forward arm part providing an abutting surface for the rearward end of said last mentioned spring, abutment means on said rearward arm part, a tension member connected to the forward end of said last mentioned spring and having at its rearward end a forwardly facing surface adapted to engage the abutment means on said rearward arm part, a second forwardly facing surface on said tension member adapted to engage a rearwardly facing surface on the abutment means on said forward arm part, the last mentioned spring exerting sufficient force relative to the first mentioned spring to maintain the last mentioned forwardly facing surface on the tension rod normally against the abutment means on said forward arm part, all in such manner that the arm takes a normal uncoupled position with the said forwardly facing surfaces on the tension member in engagement with the abutment means on the rearward arm part and the forward arm part respectively, and a rearwardly facing surface on the forward portion of said tension member adapted to be engaged by the abutment means on the forward arm part when said forward arm part is extended to limit extension of the arm.

15. A two part coupler arm comprising a rearward tube adapted to be mounted on a supporting body, a forward tube adapted to be extended from said rearward tube and to retract, a torsion spring member arranged substantially coaxially of said coupler arm tubes, means non-rotatably but longitudinally slidably mounting one end of said spring member in one of said tubes, and means non-rotatably mounting the other end of said spring member in the other of said tubes.

16. In combination, a coupler arm embodying a rear supporting part and a forward part adapted to be extended from said forward part and to retract, a connecter head on the forward end of said forward part, lock means movably mounted on said head and operable automatically to lock said head to a mating head, a compression spring coaxial with said arm acting to cause extensive movement of said forward arm part, a tension rod running through said arm, an abutment in the rear arm part adapted to pass said rod, a head on the rear end of said tension rod adapted to engage said abutment, a compression spring on the forward arm part acting to hold the tension rod yieldingly in a forward position with its rear end head in engagement with the rear arm part abutment, and to resist extensive movement of said arm parts, and means connected with the tension rod for releasing the lock means during relative extensive movement of said arm parts.

ALBERT S. JOHNSON.